(12) United States Patent
Krumm et al.

(10) Patent No.: US 6,993,592 B2
(45) Date of Patent: Jan. 31, 2006

(54) LOCATION MEASUREMENT PROCESS FOR RADIO-FREQUENCY BADGES

(75) Inventors: John Krumm, Redmond, WA (US); Gregory Smith, Bellevue, WA (US); Barrett L. Brumitt, Redmond, WA (US); Stephen C. Harris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 10/137,238

(22) Filed: May 1, 2002

(65) Prior Publication Data

US 2003/0206115 A1 Nov. 6, 2003

(51) Int. Cl.
*G06F 15/16* (2006.01)
(52) U.S. Cl. ....................... 709/236; 342/450; 342/451
(58) Field of Classification Search ................ 709/201, 709/202, 203, 206, 207, 217, 218, 219, 248; 340/539.1, 573.1, 572, 5.8, 5.81; 455/456, 455/67.11, 115
See application file for complete search history.

(56) References Cited

U.S. PATENT DOCUMENTS

| | | | | |
|---|---|---|---|---|
| 5,455,851 A | * | 10/1995 | Chaco et al. | 340/825.49 |
| 5,596,313 A | * | 1/1997 | Berglund et al. | 340/539.1 |
| 5,686,902 A | * | 11/1997 | Reis et al. | 340/10.2 |
| 5,796,827 A | * | 8/1998 | Coppersmith et al. | 455/100 |
| 5,977,913 A | * | 11/1999 | Christ | 340/825.36 |
| 6,011,487 A | | 1/2000 | Plocher | |
| 6,072,396 A | * | 6/2000 | Gaukel | 340/539.1 |
| 6,184,829 B1 | * | 2/2001 | Stilp | 342/387 |
| 6,204,813 B1 | * | 3/2001 | Wadell et al. | 342/463 |
| 6,266,013 B1 | * | 7/2001 | Stilp et al. | 342/387 |
| 6,281,834 B1 | * | 8/2001 | Stilp | 342/174 |
| 6,285,321 B1 | * | 9/2001 | Stilp et al. | 342/465 |
| 6,400,320 B1 | * | 6/2002 | Stilp et al. | 342/457 |
| 6,418,372 B1 | * | 7/2002 | Hofmann | 701/209 |
| 6,512,478 B1 | * | 1/2003 | Chien | 342/357.1 |
| 6,600,407 B2 | * | 7/2003 | Paek | 340/825.69 |
| 6,611,755 B1 | * | 8/2003 | Coffee et al. | 701/213 |
| 6,839,027 B2 | * | 1/2005 | Krumm et al. | 342/465 |
| 6,920,330 B2 | * | 7/2005 | Caronni et al. | 709/203 |
| 2001/0040513 A1 | * | 11/2001 | McDonald | 340/825.49 |
| 2002/0008621 A1 | * | 1/2002 | Barritz et al. | 340/572.1 |

(Continued)

OTHER PUBLICATIONS

Addlesee M., R. Curwen, S. Hodges, J. Newman, P. Steggles, A. Ward and A. Hopper. Implementing a Sentient Computing System. In IEEE, pps. 50-56, Aug. 2001.

(Continued)

*Primary Examiner*—Rupal Dharia
*Assistant Examiner*—Ajay Bhatia
(74) *Attorney, Agent, or Firm*—Lyon & Harr, LLP; Richard T. Lyon

(57) ABSTRACT

A process for determining the location of entities carrying transmitters (TXs) that transmit TX ID messages to at least one receiver (RX) connected to a computer, in a network of computers. Each RX sends data messages to its associated computer which includes an identifier identifying the TX transmitting the TX ID message, the signal strength of the received TX ID message, and a RX identifier. Each RX computer generates badge hit messages from each data message, and provides them to a centralized computer of the network. The centralized computer generates a badge hit table having a separate entry for each badge hit message, which has fields including the information received in the badge hit message and a hit time indicating the time the entry was added to the table. The badge hit table data is used to determining the location of the TXs, and so the entities.

9 Claims, 9 Drawing Sheets

U.S. PATENT DOCUMENTS

| | | | |
|---|---|---|---|
| 2002/0008624 A1* | 1/2002 | Paek | 340/572.1 |
| 2002/0101375 A1* | 8/2002 | Stilp et al. | 342/465 |
| 2003/0007473 A1* | 1/2003 | Strong et al. | 370/338 |
| 2003/0095032 A1* | 5/2003 | Hoshino et al. | 340/5.92 |
| 2005/0093745 A1* | 5/2005 | Krumm et al. | 342/465 |

OTHER PUBLICATIONS

Bahl, P. and V. N. Padmanabhan. Radar: An In-Building RF-based User Location and Tracking System. MCS Research.

Bokun, I. And K. Zielinski. Active Badges—The Next Generation. Olivetti-Oracle Research Laboratory, Cambridge, UK.

Demers, A. Research Issues in Ubiquitous Computing. Xerox Palo Alto Research Center. 1994 ACM 0-89791-654-9/94/0008.

Djuknic, G.M. and R. E. Richton. Geolocation and Assisted GPS. In Computer Innovative Technology for Computer Professions. Feb. 2001, vol. 34, No. 2.

Hightower, J. and G. Borriello. Location Systems for Ubiquitous. In Computer Innovative Technology for Computer Professionals. Aug. 2001, vol. 34, No. 8.

Hopper, A., A. Harter, and T. Blackie. The Active Badge System. Interchi '93. ACM 0-89791-575-5/93/0004/0533.

Leonhardt, U. and J. Magee. Multi-Sensor Location Tracking. Imperial College, Dept of Computing, London, UK.

Spreitzer, M. and M. Theimer. Prividing location information in a ubiquitous computing environment. In Proceedings of the 14$^{th}$ ACM Symposium on Operating System principles, vol. 27 of ACM SIGOPS, pp. 270-283, 1993.

Want, R. and B. Schilit. Expanding the Horizons of LocationAware Computing. In IEEE, 2001.

Want, R., A. Haopper, V. Falcao and J. Gibbons. The active badge locations system. ACM Transactions on Informations Systems, Jan. 1992, 91-102.

* cited by examiner

LOCATION MEASUREMENT PROCESS FOR RADIO-FREQUENCY BADGES

BACKGROUND

1. Technical Field

The invention is related to location tracking systems, and more particularly to a system and process for determining the location of persons and objects carrying radio frequency (RF) transmitters that transmit data messages to at least one RF receiver connected to a computer in a computer network. The receivers forward data received from the transmitters to the network, along with radio signal strength indicator (RSSI) data, for computation of the location of the person or object carrying each transmitter.

2. Background Art

Knowledge of the location of people and objects is essential to the viability of many current mobile and ubiquitous computing schemes. For example, in a mobile computing environment, a user of a mobile computing device (e.g., notebook computer, handheld PC, palm-size PC, Personal Digital Assistant (PDA) or mobile phone) may wish the device to provide directions to a particular location in a building, such as the nearest printer, snack room, restroom, etc., or perhaps directions to a particular conference room or office within the building. This type of information is dependent on knowing the current location of the user. Mobile computing device users also typically expect messages and other notification information to be provided to them wherever they happen to be. However, some notifications can be dependent upon the user's location. For instance, a user might be notified that he or she is near a printer where a user-submitted document has been printed. Again the user's current location is needed to make such a notification. A mobile computing device user might also want to know the location of other people in the building, in order to find them or obtain information about them. For example, a user might want to get a list of the names of people attending the same meeting. To obtain this information, it is necessary to know what people are at the location of the meeting. The foregoing are just a few examples of the need to know the location of people. It is easy to imagine many other situations where knowledge of the location of people would be useful to a mobile computing device user.

Location information is equally critical in so-called ubiquitous computing. Ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large environment), through whatever set of devices is available, be they fixed or carried by the user.

It is noted that the term computer is used loosely here in that the user actually would have access to a wide variety of computing and information services, which will likely employ many computers and "smart" devices such as the aforementioned PDA's, mobile phones, etc. For example, computing services such as web browsing, document editing, or video conferencing are envisioned. Thus, it should be understood that when the term computer is used in connection with the concept of ubiquitous computing, in actuality many computers may be involved non-exclusively in a single interactive session.

The usefulness of an ubiquitous computing system hinges on the ability to maintain an awareness of the users, particularly their locations. One goal of such a system would then be to understand the physical and functional relationship between the users and various I/O devices. This knowledge could be employed to allow a user to move from room to room while still maintaining an interactive session with the computer. In addition, knowledge about who and what is in the vicinity of a person can be used to tailor a person's environment or computing session to behave in a context-sensitive manner. For example, knowing the location of a person in a building can be used to infer what activity that person is engaged in and then the environment or computing session can be adjusted appropriately.

There are several current technologies for automatically determining the location of people and objects. For example, one of the first of such location systems uses diffuse infrared technology to determine the location of people and objects in an indoor environment. A small infrared emitting badge (sometimes referred to as a button or tag) is worn by each person, or attached to each object, whose location is to be tracked. The badge automatically emits an infrared signal containing a unique identifier every 10 seconds, or upon request of a central server. These requests are transmitted to the badges via a series of fixed infrared sensors placed throughout the indoor environment—typically mounted to the ceiling. The sensors also receive the infrared emissions from badges within their line-of-sight. The central server, which is hardwired to each sensor, collects the data received by the sensors from the badges and provides it to a location program for processing. These types of systems do not provide the actual 3D location of the person or object carrying the badge. Rather, the person's or object's location is deemed to be within the room or area containing the infrared sensor that received the emission from the badge attached to the person or object. In addition, these systems, being infrared-based, are susceptible to interference from spurious infrared emissions from such sources as fluorescent lighting or direct sunlight. Further, diffuse infrared-based systems have a limited range, typically only several meters. Thus, except in small rooms, multiple sensors are required to cover the area. In addition, since the sensors must be within the line-of-sight of the badges, a sensor must be placed in every space within a room that cannot be seen from other parts of the room. As a result, a considerable number of sensors have to be installed and hardwired to the central server. This infrastructure can be quite expensive and in some cases cost prohibitive.

Other existing indoor location systems attempt to improve the accuracy of the location process using a combination of radio frequency and ultrasonic emission. In these systems, a central controller sends a request for location data via a short range radio transmission to each badge worn by the people, or attached to the objects, whose location is being tracked. In response, the badges emit an ultrasonic pulse to a grid of fixed receivers, which are typically mounted to the ceiling. Each receiver that "hears" the ultrasonic pulse emitted from a badge reports its distance from the badge to the central controller via hardwired connections. Specifically, a synchronized reset signal is sent to each receiver at the same time the location request is transmitted to the badges. This reset signal starts a timing procedure that measures the time between the reset signal and the receipt of a ultrasonic pulse for a badge within range of the receiver. The receiver then computes its distance from the badge emitting the pulse and reports this to the central controller. An ultrasound time-of-flight lateration technique is then used by the controller to accurately determine the locations of the badges. While these types of systems do provide very accurate location information, they again require an expensive infrastructure in form of multiple receivers mounted throughout the environment which must be hardwired to the central controller. In addition, the accuracy of these systems has been found to be adversely affected if the placement of the receivers is less than optimal. Further, there is a concern associated with animals being sensitive to ultrasonic emissions.

A variation of the combined radio frequency and ultrasonic location system requires the badges to determine their own location, presumably to compute directions, and the like, and to provide the information to a person carrying the badge. In this case there is no centralized controller that determines locations of all the badges. Specifically, ultrasonic emitters are mounted in various locations around an indoor space. The badges include a radio frequency transceiver. Whenever location information is desired, the badge transmits a radio frequency signal. The emitters pick up the signal from the badges and respond with an ultrasonic pulse. The badge unit measures the time it takes to receive each ultrasonic pulse emitted by an emitter within range of the badge. In addition to the ultrasonic pulse, the emitters also transmit a radio frequency signal that identifies the emitter and its location. From the timing and emitter location information, the badge triangulates its own position. The infrastructure is not as problematic in this latter system since there can be fewer emitters and they are not hardwired into any kind of centralized controller. However, only the badge unit knows its location. Thus, there is no centralized database to provide location information to help locate persons in the building. In addition, the badges are relatively complex in that they must include both a radio frequency transceiver and an ultrasonic receiver, as well as the processing capability (and so power burden) to compute their location.

In yet another indoor location system, radio frequency LAN wireless networking technology is used to determine the position of people, or more specifically a computing device employing the wireless LAN technology (such as a notebook computer). In this system, base stations are deployed within the indoor environment to measure the signal strength and signal to noise ratio of signals transmitted by the wireless LAN devices. A centralized program takes the signal information from the base stations and employs a lateration process to estimate the location of the transmitting unit. This system has the advantages of requiring only a few base stations and using the same infrastructure that provides the building's general purpose wireless networking. However, person or object being tracked must have a device capable of supporting a wireless LAN, which may be impractical on small or power constrained devices.

Other current systems also employ radio frequency technology to locate people and objects in an indoor environment. One such system uses a centralized base station and a series of antennas spread throughout the environment that each emit a RF request signal which is received by badges within range of the antenna. These badges, which are attached to people and objects whose location is being tracked, transmit a RF signal in reply with an identifying code embedded therein. The location of the badge relative each antenna is computed using a measurement of the time it takes for the base station to receive the reply via the various antennas after the request is transmitted. However, the antennas have a narrow cone of influence, which can make ubiquitous deployment prohibitively expensive.

Electromagnetic sensing is also employed for position tracking. These types of systems generate axial DC magnetic field pulses from a fixed antenna. The system then computes the position of the receiving antennas by measuring the response in three orthogonal axes to the transmitted field pulse. However, the infrastructure needed for these systems is expensive and the tracked object must be tethered to a control unit.

Finally, position tracking has been accomplished using computer vision techniques. In these systems, cameras are employed to determine where persons or objects of interest are located in an indoor environment. While these types of position tracking systems can be quite accurate, the processing required to analyze each camera frame is substantial, especially when complex scenes are involved. Thus, the infrastructure costs for these systems can be very high.

SUMMARY

The present invention is directed toward a system and process for determining the location of persons and objects in an environment that overcomes the limitations of existing location systems by utilizing existing infrastructure to minimize overhead costs and by employing a compact, simple radio frequency (RF) transmitter as a badge.

The system includes a plurality of battery-powered, radio frequency (RF), transmitters (TXs) that are carried by the person or object being tracked. One, or typically more, RF receivers (RXs) are used to receive TX ID messages transmitted by TXs within signal range of the RX. Each RX is connected to a computer, which receives data messages from the RX generated using a TX ID message received from a TX. A centralized computer is in communication with each of the computers associated with a RX via a conventional network. The centralized computing device tracks the location of each person or object carrying a TX, using data derived from data messages forwarded to it from the RX-connected computers.

The TX ID messages transmitted by each TX include at least a transmitter identifier which uniquely identifies the particular TX transmitting the TX ID message. Each RX receiving the TX ID message from a TX measures the strength of the signal carrying the message to produce a radio signal strength indicator (RSSI). The RX then generates a data message that is sent to the computer associated with the RX. This data message includes the transmitter identifier from the TX ID message, the RSSI associated with the TX ID message and a receiver identifier that uniquely identifies the particular RX sending the data message. Each computer associated with a RX generates badge hit messages upon receipt of a data message from the RX and provides the badge hit messages to the centralized computer of the network. These badge hit messages each include the information received in the data message, as well as an identifier identifying the computer in the network. A badge hit table is created using the badge hit messages in a badge hit database residing on the centralized computer. Essentially, the badge hit table has a separate entry derived from each badge hit message received. The fields associated with each entry include the information received in the badge hit message and a hit time assigned to the entry indicating the time the entry was added to the table.

The location of each TX transmitting a TX ID message is computed using the badge hit table data. The computed location is then used to update an entity location table of a geometric model database. The geometric model database contains information concerning the descriptions of the locations of people, devices, places, and objects in the world. The entity location table is essentially a list of entities and the TX identifier of a TX that is associated with each entity, as well as the location of the entity if known. An entity is simply a person, object or a collection of persons and objects, and the location of the entity is the location determined for the associated TX. The process for computing the locations of the TXs, which is referred to as the sensor fusion process, can be performed by the centralized computer's badge hit database. This is particularly efficient if the geometric model database resides on the centralized computer. However, if the geometric model database runs on a computer other than the centralized computer, then it may be more efficient to transfer the raw badge hit table data and have the sensor fusion process performed by the geometric model database.

The aforementioned sensor fusion process for determining the location of the TXs in the location tracking system first involves a screening phase in which the entries of the badge hit table are screened to ensure that only entries having a signal strength value equaling or exceeding a prescribed level, and that only one entry attributable to the same TX transmission (in cases where more than one RX received the TX ID message), are used to determine the location of a TX whose transmission resulted in the entry.

The screening phase begins by, for each entry of the badge hit table, determining whether the signal strength value of the entry exceeds a signal strength threshold. This signal strength threshold is chosen to correspond to the signal level a RX would measure if the transmitting TX was within a prescribed distance (e.g., 1–2 meters) of the RX. This improves the accuracy of the location determining procedure as will become clear shortly. When it is found that the signal strength of the entry equals or exceeds the signal strength threshold, then the entry is deemed to have passed the thresholding test. Otherwise, the entry is ignored for purposes of computing the location of the associated TX. For each entry passing the thresholding test, it is next determined if a time table has been established for the associated TX. If not, one is created. The time tables log the hit time of each entry associated with a particular TX that passed the thresholding test. To this end, the hit time of the entry under consideration is logged into the time table assigned to the associated TX, regardless of whether the table was just created or existed previously. It is next ascertained whether the difference in the hit time of the entry under consideration and that of any of the previously logged hit times (if any) in the time table assigned to the TX associated with the entry, fall within a prescribed time period. If none of the computed differences fall within the period, then the entry is deemed to have cleared a time conflict resolution test. If, however, any of the computed differences do fall within the period, then it is assumed the entries involved are attributable to the same or a redundant TX transmission that gives no new location information. Given this assumption, just one of them is selected for further processing to determine the location of the TX. The entry selected is then deemed to have cleared the time conflict resolution test. Those entries clearing the time conflict resolution test are used to determine the location of the TX, as will be described shortly. However, first it is noted that the entry selected among those assumed to be attributable to the same or a redundant TX transmission, can be selected in a number of ways. For example, the entry could be selected at random, or the entry having the earliest hit time could be selected. However, in tested embodiments of the sensor fusion process, the entry having the most recent hit time was chosen.

The location determining phase of the sensor fusion process is performed on those entries passing the time conflict resolution test. Essentially, the location determining procedure involves determining the location of the TX based on the known location of the RX identified in the aforementioned entry. The RX locations are obtained from the geometric model database, which maintains a list of each RX and its location within the environment (such as an office building) modeled by the database. Specifically, it is determined whether the entity associated with the TX identified in the entry under consideration has a location assigned to it in the entity location table of the geometric model database. If it does not, one is assigned to it. This can be done in one of two ways depending on if the locations are to be expressed in terms of a semantic location, like "inside room 123", or by a metric location, like "(x, y)" relative to a prescribed coordinate frame. If a semantic scheme is employed, the location assigned to the entity is deemed to be the location of the RX identified in the entry under consideration. If a metric scheme is employed, then the location of the entity is designated as being within a prescribed distance from the known location of the RX identified in the entry under consideration. This prescribed distance is based on the offset distance used to define the previously-described signal strength threshold. When it is discovered that a location designation already exists in the entity location table, then it is ascertained whether the location is the same as the location listed for the RX identified in the entry under consideration (if a semantic scheme is employed) or with the prescribed distance from the listed RX location (if a metric scheme is employed). If the existing entity location is the same as, or within the prescribed distance from, the RX location, then it is deemed that the TX (and so the entity) has not moved. In such a case no action is taken. However, if the existing entity location is not the same or is not within the prescribed distance from the RX location, then the location currently assigned to the entity is replaced with the location of the RX (semantic scheme), or with a location specifying that the entity is within the prescribed distance from the location of the RX (metric scheme).

It is noted that the previously-described screening procedure can be expanded to remove stale location designations from the entity location table. Specifically, for each time table associated with a TX, the time table is examined to determine if the most recent hit time of the badge hit entries referenced in the table is earlier than a time defined by the time of examination less a prescribed timeout period. When it is earlier, any location designation assigned to the entity associated with the TX whose time table is under consideration is deleted from the entity location table of the geometric model database.

It is also noted that the TX ID messages transmitted by the TXs can include error detection data, preferably in the form of a message count and conventional checksum value. The message count is simply a number which is incremented each time a TX transmits a TX ID message. If the message count is too high then it is deemed that an interim TX ID message was lost. The checksum is used to determine if a received TX ID message is incomplete or corrupted. The RX computer could determine if a TX ID message is out of sequence or damaged, and if so forego sending the message data to the centralized computer. Or, if the RX computer determined the TX ID message to be undamaged, it could forward the data to the centralized computer in the aforementioned data message and include the message count value. The centralized computer then decides whether or not to use the other data in the data message for locating purposes.

The accelerometer data can also be included in the TX ID message. If so, this data can be forwarded to the centralized computer and used to perform motion studies and the like. Specifically, an accelerometer signal history in the form of a count of the number of times the accelerometer signal exceeded the accelerometer signal level threshold in the aforementioned prescribed period of time is included in the TX ID message. Preferably, a separate count is included for each consecutive prescribed period of time occurring since the last transmission of a TX ID message.

The location tracking system can also alternately employ a personal identification number (PIN) scheme. In this scheme, a user enters a PIN into an input apparatus, such as a number keypad on the TX. Whenever a TX ID message is transmitted by the TX, the microcontroller includes the PIN in the message, in addition to or in lieu of the transmitter identifier. The PIN is used to identify the entity carrying the TX, and is included in the entity location table of the geometric model database in lieu of the transmitter identifier. In this way, an entity can be associated with any TX by simply entering a PIN number, rather than being tied in the geometric database to a particular TX.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
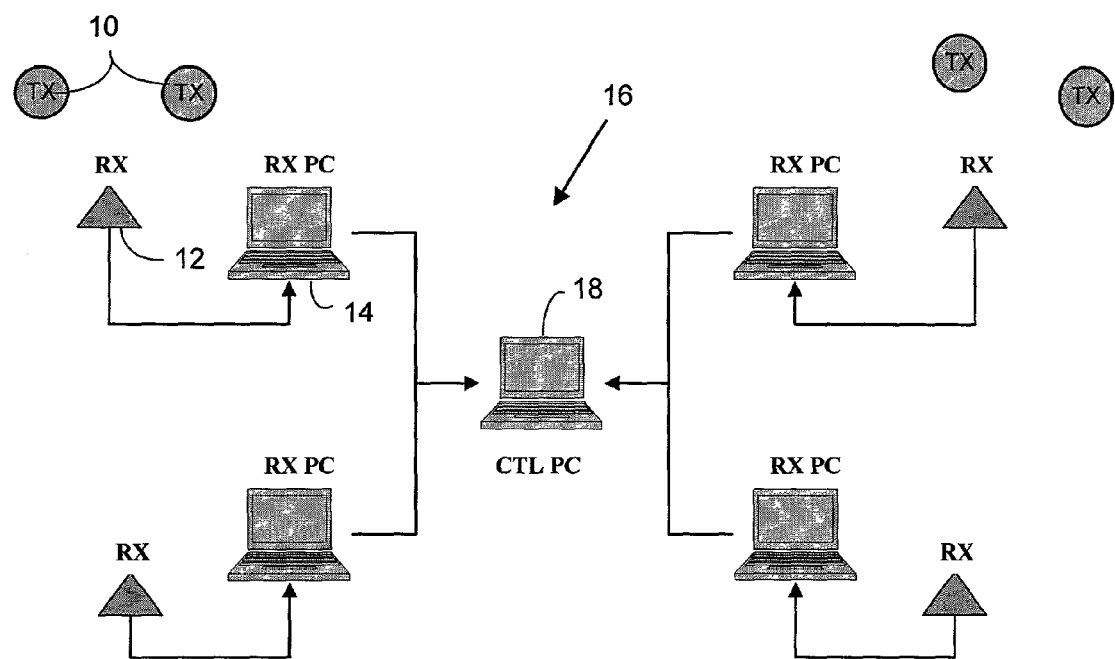
FIG. 1 is a diagram depicting a location tracking system employed by the present invention.

Referring to FIG. 1, the location tracking system employing the present location measurement process tracks the location of persons and objects carrying radio frequency (RF) transmitters 10 that transmit messages to at least one RF receiver 12. Each receiver 12 is connected to a computing device 14, such as a personal computer (PC) that is in turn part of an existing network 16 of such computing devices. The receivers 12 forward data received from the transmitters 10, along with radio signal strength indicator (RSSI) data, to a centralized computer 18 via the network 16. The centralized computer computes the location of persons and objects associated with each transmitter based on the forwarded data and RSSI, using conventional methods. The location tracking system can be used in any environment, indoors or out. For instance, the receivers could be placed in every office in a building to determine which office a person or object is closest to.

One of the major advantages of the foregoing location tracking system is that it employs an existing computer network, thereby avoiding the considerable infrastructure cost associated with many of the previously described location systems. The present location measurement process resides on the network as will be described shortly.

Figure 2:
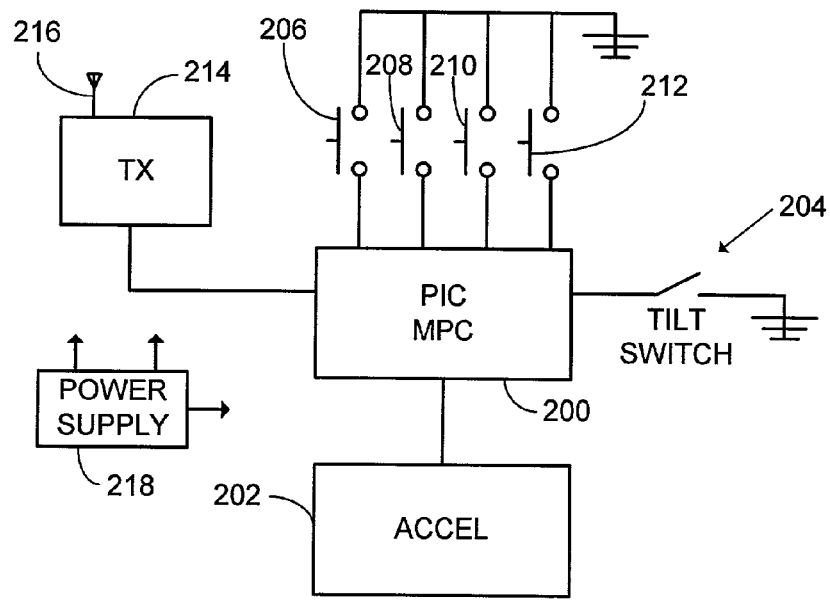
FIG. 2 is a block diagram illustrating the internal components included in the RF transmitter employed in the location tracking system of FIG. 1.

The transmitter (TX), or badge as it is often called, can take on various forms. For example, the TX could be a small palm-sized unit resembling an automobile key fob, or a button-like device no bigger than a large coin. It is also envisioned that TXs having the size and thickness of a credit card are possible. This latter version could be carried in a wallet or worn like a security badge. The TX can even be configured to fit inside articles commonly carried with a person, such as a pen. However, regardless of its outward appearance, the general operating components of the TX are the same. Referring to the block diagram of FIG. 2, the general construction of the TX will be described. The heart of the TX is a PIC microcontroller 200, which is connected to several other components. For example, there are one or more manually-operated switches connected to the microcontroller 200. In a prototype TX, four switches where included. The first two of the switches 206, 212, are "power-on" and "power-off" switches, respectively. Whenever the power-on switch 206 is activated, the TX is powered up and begins operations. Conversely, when the power-off switch 212 is activated, the TX is off. Thus, this switch 312 acts as a hard shutdown. This hard shutdown mode not only saves battery life when the TX is not needed for providing location information, but affords a degree of privacy to a person carrying the TX since he or she can shut the unit off when they do not want their location known. The third switch 208 is a "continuous transmission mode" switch. This switch 208 is also normally off, and when it is off, the TX acts in the aforementioned "battery saving" mode. However, when the continuous transmission mode switch is activated, the TX transmits a TX ID message at prescribed intervals (e.g., every 1 second). The fourth switch 210 is a "send-once" switch. This switch is normally off, but in one version when activated initiates the transmission of a TX ID message from the TX, regardless of the when the next transmission was scheduled.

The TX can optionally include an accelerometer 202, the signal output of which is provided to the microcontroller 200. The accelerometer's output signal can be used for a variety of purposes as will be described later. In versions of the TX where battery power is conserved by shutting down the unit if no appreciable movement is detected (i.e., the TX is operating in a "battery saving" mode that will be described in detail later), a tilt switch 204 is connected to the microcontroller. The tilt switch 204 closes and an interrupt signal to the microcontroller to "wake" it up, whenever the TX is moved after having gone into its shut down mode. It is noted that when the power-off switch 206 is in the off position, the TX is off regardless of the position of the tilt switch 204. Thus, this switch 206 acts as a hard shutdown and is unaffected by movement of the TX. This hard shutdown mode not only saves battery life when the TX is not needed for providing location information, but affords a degree of privacy to a person carrying the TX since he or she can shut the unit off when they do not want their location known. As mentioned above, whenever the continuous transmission mode switch 208 is activated, the TX transmits a TX ID message at prescribed intervals. This is done regardless of whether the accelerator signal indicates the TX is moving or not. While battery life is not conserved in this mode, it is useful for motion studies and the like where the accelerometer data is transmitted along with the identity and other data components of a TX ID message transmitted by the TX, as will be described later. A radio frequency transmitter 214 with a small antenna 216 extending therefrom, is also connected to and controlled by the microcontroller 200, and a power supply 218 provides power to the above-described components of the TX.

The aforementioned TX ID message transmitted by each TX includes an identification number uniquely identifying the TX. In a prototype TX this identification number was an 8-bit code that is pre-programmed into the PIC microcontroller. The TX ID message can also include optional data such as a message count value, checksum, and accelerometer data. The optional message count number and checksum are used for error detection purposes. In one version of the TX ID message, the message count number is an 8-bit value that identifies the number of messages sent since the TX was last activated (or since the count value rolled over since the 8-bits only allow 256 different values). The TX increments the message count number each time a new TX ID message is to be transmitted. Thus, the receiver or network will know an out of sequence message has been received from a particular TX, thereby indicating an interim message was lost.

As for the optional accelerometer data, this can be used for motion studies and the like. In one version of the TX ID message, the accelerometer data takes the form of a count of the number of times the accelerometer signal exceeded an accelerometer signal level threshold in a prescribed period of time (e.g., 1 second). Preferably, a separate count is included for each consecutive prescribed period of time occurring since the last transmission of the TX ID message.

Figure 3:
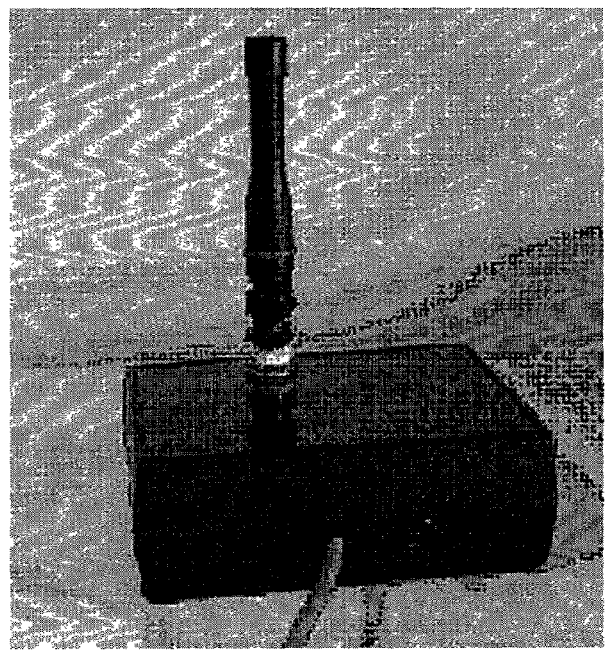
FIG. 3 is an image depicting the exterior of one version of the RF receiver employed in the location tracking system of FIG. 1.

The RF receiver (RX) used in the location system will now be described. In one version, as shown in FIG. 3, the receiver unit (RX) is a small, stand-alone box with connections for DC power and communications with the PC, respectively, and an external antenna. The communication with the PC can be done serially via a RS232 communication interface. However, other communication interfaces can also be employed as desired. For example, the PC communications could be accomplished using a Universal System Bus (USB), or IEEE 1394 (Firewire) interface, or even a wireless interface. The RX could take other forms as well. For example, the RX can be integrated into the PC itself by configuring it as an expansion card which is installed in an expansion slot of the PC. In such a case only the antenna need be external to the PC.

Figure 4:
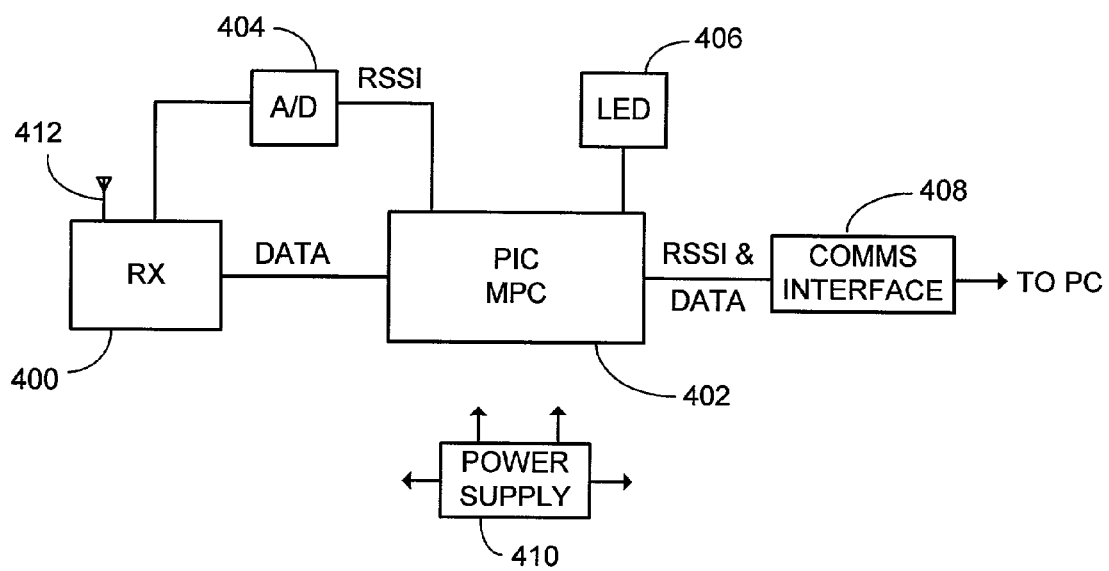
FIG. 4 is a block diagram illustrating the internal components included in the RF receiver employed in the location tracking system of FIG. 1.

Regardless of the form the RX takes, the general operating components are the same. Referring now to the block diagram of FIG. 4, the general construction of the RX will be described. The antenna 412 receives a message signal from a TX and the radio frequency receiver 400 demodulates it to produce a DATA signal for input into a PIC microcontroller 402. The receiver 400 also generates a conventional radio signal strength indicator (RSSI) signal which is fed into the microcontroller 402 via an analog to digital converter 404. The converter 404 may be integrated into the microcontroller 402 as it was in the prototype RX. An optional LED 406 is connected to the microcontroller 402 and indicates the power on/signal received status of the RX. This LED 406 extends through the case of the RX so as to be visible from the outside. The microcontroller 402 provides a separate output representing a combined RSSI and DATA signal for each received TX ID message signal, as will be described shortly. A communication interface 408 converts microcontroller voltage levels to levels readable by a computing device, such as a PC, which is in communication with the RX. Power for the RX components is provided by power supply 410, which in the prototype is a separate mains powered AC circuit providing 7 to 30V DC.

Whenever a TX ID message is received from a TX and processed as described above, the RX outputs a data message to the computing device (such as a PC), to which it is connected. This data message includes the identification number of the TX, and optionally the error detection data (i.e., the message count value and checksum), and accelerometer data (if transmitted by the TX). This information is taken from the TX ID message received from the TX and collectively represents the aforementioned DATA signal. In addition to the foregoing items, the information output by the RX also includes the RSSI data associated with the received TX ID message and a unique receiver identifier.

The error detection information is optional because the RX itself could be made responsible for filtering potentially inaccurate TX ID message data. Specifically, the RX would forego sending information derived from TX ID messages that are known to have an error, such as a checksum error. Thus, the error detection data need not be included in the data message sent by the RX. However, if the task of dealing with errors in the TX ID messages is assigned to the computing device connected to the RX, or some other computing device in the network, the error detection data would be included in the RX's data message.

Figure 5:
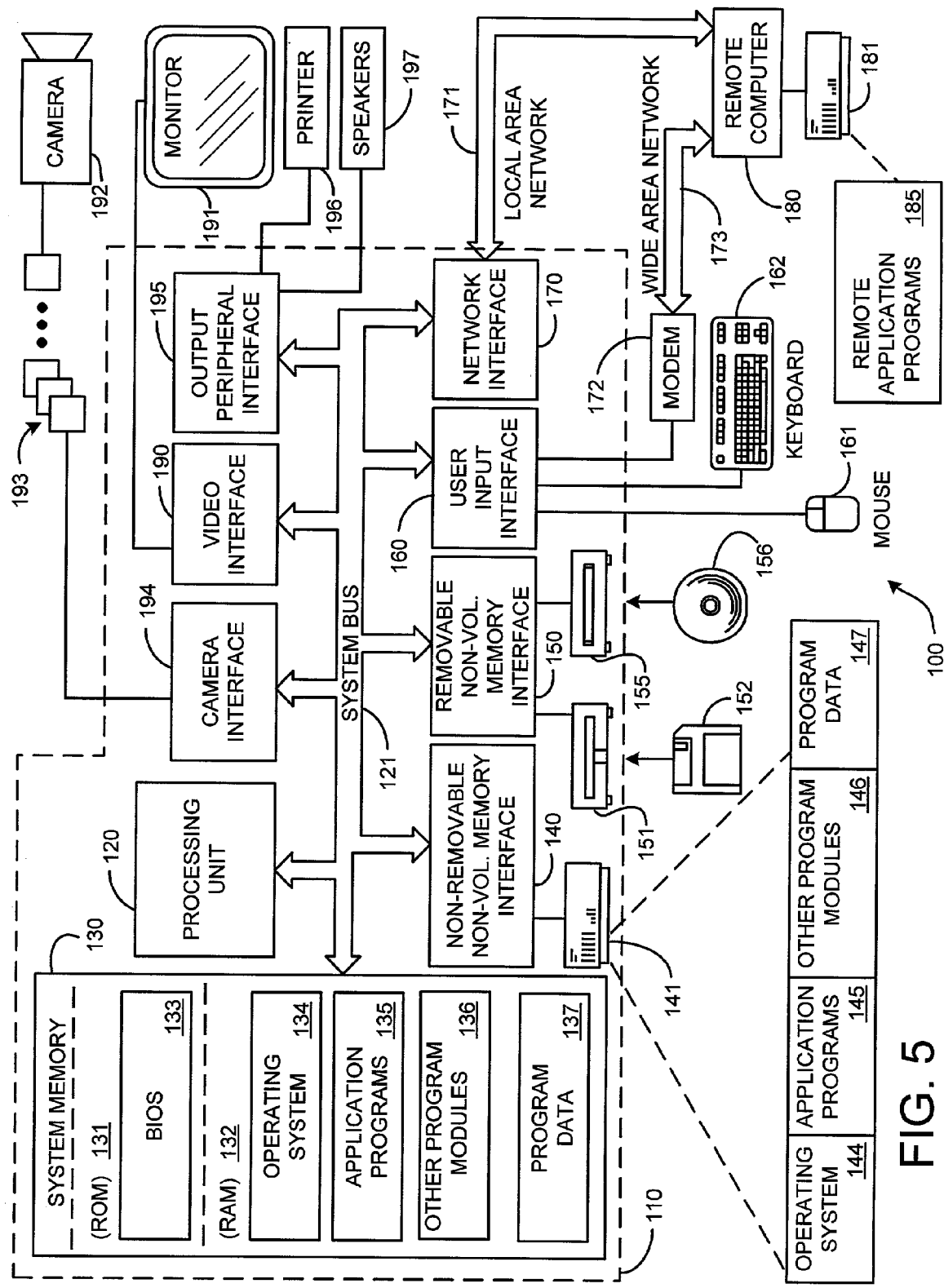
FIG. 5 is a diagram depicting a general purpose computing device constituting an exemplary system for implementing the present invention.

As indicated previously, the data messages provided by the RX's for each TX ID message received are processed by the computing devices in the aforementioned network. The present invention embodies this processing of the data messages for determining the location of people and objects carrying a TX. However, before providing a description of the preferred embodiments of the present invention, a brief, general description of a suitable computing environment in which the invention may be implemented and the aforementioned computing devices, will be described in more detail. FIG. 5 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like (which will collectively be referred to as computers or computing devices in the description of the invention).

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Further, a camera 163 (such as a digital/ electronic still or video camera, or film/photographic scanner) capable of capturing a sequence of images 164 can also be included as an input device to the personal computer 110. While just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the present location measurement process. Generally, the process according to the present invention involves determining the location of entities carrying the TXs of the previously-described location tracking system. An entity is a person, object or a collection of persons and objects. In general, this is accomplished via the following process actions, as shown in the high-level flow diagram of FIG. 6:

a) each computer associated with a RX generates badge hit messages upon receipt of a data message from the RX and provides the badge hit messages to the centralized computer of the network, where a badge hit message includes a transmitter identifier, the signal strength indicator associated with the TX ID message and a receiver identifier that uniquely identifies the particular RX sending the data message (process action 600);

b) generating a badge hit table in a badge hit database residing on the centralized computer, where the badge hit table has a separate entry derived from each badge hit message and has fields including the information received in the badge hit message and a hit time assigned to the entry indicating the time the entry was added to the badge hit table (process action 602);

c) determining the location of each TX transmitting a TX ID message using the badge hit data (process action 604); and d) updating an entity location table of a geometric model database with the location of the entities, where the entity location table is a list of entities and the TX identifier of a TX that is associated with each entity, as well as the location of the entity if known, and where the location of the entity is the location determined for the TX associated with the entity (process action 606).

Each of these general actions will be described in detail in the sections to follow.

1.0 Badge Hit Messages

Figure 7:
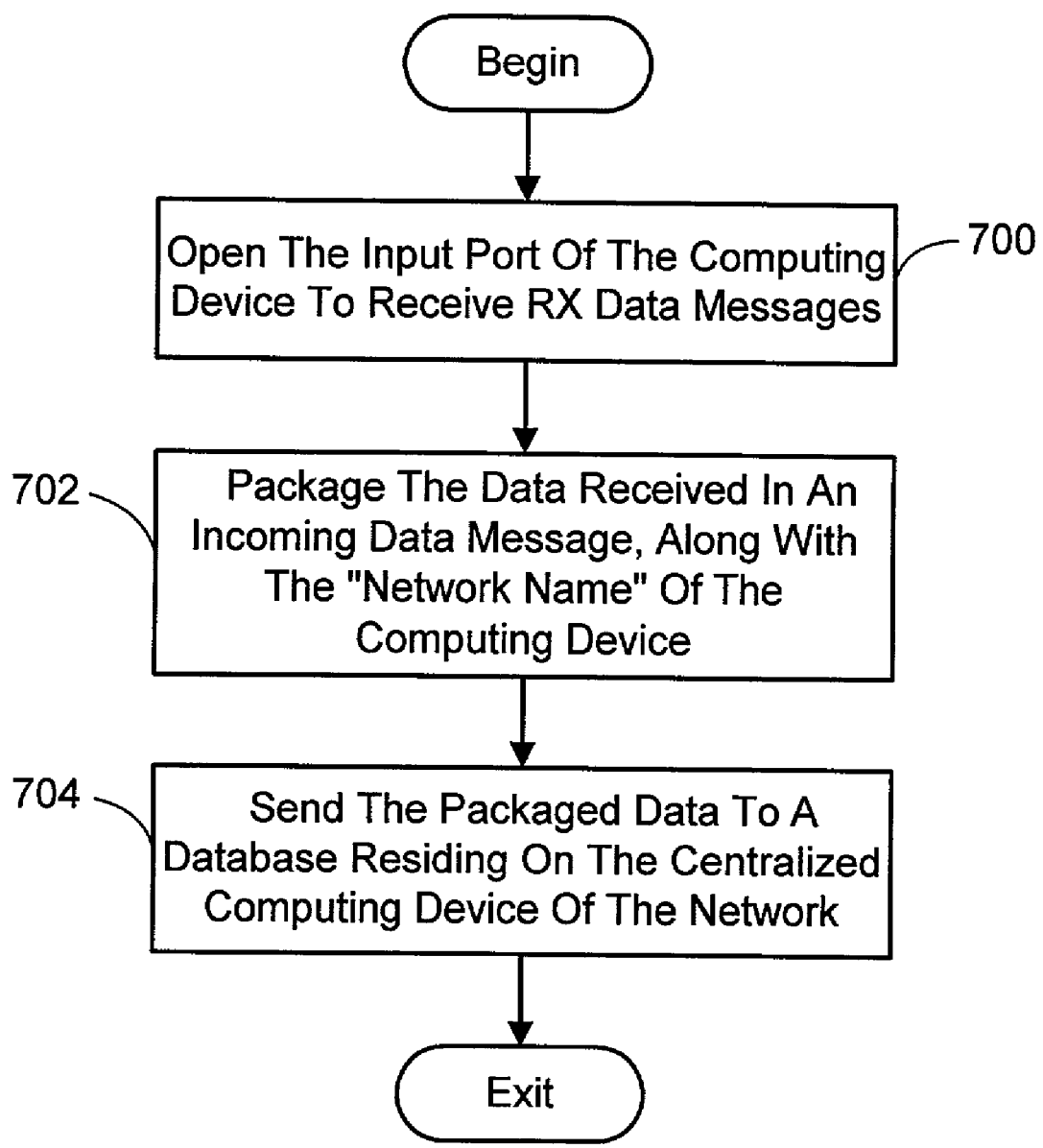
FIG. 7 is a flow chart diagramming a process for implementing the badge hit message generation module of the overall location determining process of FIG. 6.

Each computing device that is connected to an RX of the previously-described location tracking system runs a badge hit message process, which will now be described. Referring to FIG. 7, the badge hit message process begins by opening the input port of the computing device through which the data messages from the RX arrive (process action 700). For example, in the version of the location tracking system where each RX is connected to an associated computing device via a RS232 communication interface, the badge hit module opens the device's serial port and waits for messages from the RX. As described earlier, the data message output from an RX in response to the receipt of a TX ID message from a TX includes a TX identifier, signal strength data, and the RX identifier. In addition, error detection and movement data (based on the accelerometer signal) may also be included, as described previously. In process action 702, this information is packaged, along with the "network name" of the computing device. This information package is then sent to a database residing on one of the computing devices in the network (process action 704), namely the centralized computer described previously. In tested embodiments of the present location measurement process, the packaging was accomplished using a built-in OLEDB data access layer of Microsoft Corporation's Windows® operating system.

In regard to the aforementioned error detection data, it can be used in a variety of ways. For example, the RX computer could be tasked to determine whether a TX ID message has a message count increment one unit above the last, previously received, TX ID message transmitted from that TX. If the message count is too high, then it would be deemed that an interim TX ID message was lost. Likewise, the RX computer could look at the checksum to determine if a received TX ID message is incomplete or corrupted. If the RX computer determines that a TX ID message is out of sequence or damaged, it could refrain from sending a data message corresponding to this TX ID message to the centralized computer. Another alternative would be for the RX computer to include the message count value from any TX ID message found to be undamaged in the data message that is forwarded to the centralized computer. The centralized computer would then decide whether or not to use data for locating purposes if it determined it to be out of sequence.

2.0 The Badge Hit Table and Badge Hit Database

The packaged information is sent to the centralized computing device over the aforementioned network, where it is input into a database, which will be referred to as the badge hit database. In tested embodiments of the present location measurement process, the badge hit database was implemented as a Microsoft Corporation's SQL Server database and the badge hit message process provided the packaged data in the form of a SQL INSERT statement. The SQL Server database is a relational database, which has the advantage of allowing queries and computations to be run on the raw TX-hit data to get ordered or grouped sequences of hits and strengths, and then to use this data to make region and location calculations as will be described shortly.

The badge hit database generates a badge hits table having fields as shown in Table 1.

TABLE 1

| RX Computer Network Name | RX ID | TX ID | Signal Strength | Hit Time | Movement Data (Optional) | Badge Hit Counter (Optional) |
| --- | --- | --- | --- | --- | --- | --- |

The "Hit Time" field in Table 1 is the time stamp given to each information package output by an RX's associated computing device and is added by the badge hit database to each database entry when it is logged. This is done to avoid clock synchronization issues, such as would occur if the various, unsynchronized RX computing devices were to establish a hit time for an incoming data message. Instead, the centralized computer becomes the arbiter of all time measurements and any latency between the RX and the data base entries (and in particular, differences in latency for different hits or RX's) is ignored. A distributed time algorithm could be employed to allow the RX to generate a hit time, for more technically accurate times. In the tested embodiment this has not proven to be necessary. The optional "Badge Hit Counter" field in the table refers to the total number of messages logged into the database that are attributable to the TX associated with the badge hit. This number would be incremented each time a new badge hit is logged for the particular TX, and could be used to determine if an incoming message containing the aforementioned message count value is out of sequence (i.e, not one increment above the badge hit counter field value associated with the last-logged badge hit for the associated TX.

The full history of TX hits is kept in the database up to any arbitrary space limitation placed on the size of the badge hits table. Older entries can be purged or archived to keep the table reasonably sized and ensure efficient searching. Given that in tested versions of the badge hit database each record represented only about 40 bytes of data, there will presumably be more than enough history with which to contextualize the data.

The badge hits table data is primarily used to determine the location of people and objects carrying a TX. The process by which the location is computed will be described next.

3.0 Location Computation and the Geometric Model Database

Location computation is essentially the process of updating a geometric model database (sometimes referred to as a world model database) to reflect the information contained in the badge hits data. In general, a geometric model database contains information concerning the descriptions of the locations of people, devices, places, and objects in the world. In addition, a geometric model database is capable of accepting information about the geometric state of the environment, building a geometric model of this environment, maintaining and storing the geometric model, and handling queries about the environment's geometric state. It is the purpose of the present location measurement process to provide the location information necessary for the geometric model database to accomplish the foregoing tasks.

The geometric model database can be located anywhere, but for the sake of efficiency preferably resides in the centralized computer along with the collected raw badge hit data. In either case, it is necessary to process the raw data in order to obtain a consistent interpretation. This process, referred to as "sensor fusion", results in location information which is provided to the geometric model database and used to update the database. When the geometric model database resides in the centralized computer, the badge hit database typically runs the sensor fusion process, which is stored in the memory of the centralized computing device. This can also be the case when the geometric model database is located elsewhere. However, it may be more efficient to instead deliver the raw badge hit data to the remote geometric model database and let it run the sensor fusion procedure. If a remote geometric model database is to be used, the communication with the database can be initiated by the centralized computer using triggers on rows in the badge hit table, or it could be initiated by the geometric model database via a conventional polling procedure.

Any conventional geometric model database structure can be employed. However, regardless of which format is used, certain information is pre-programmed into the database in the form of an entity location table. Specifically, the entity location table has entries including a TX identifier that identifies the TX associated with the entry. This TX identifier can be the same as that provided in the TX ID messages. The entity location table entries each also include a designation of the entity associated with each TX. An entity is either a particular person or object (e.g., a laptop computer, cellular telephone, etc.), or it can represent a collection entity which groups a person with devices and objects which are carried by that person. Each entity location table entry also has a field describing the last known location of the entity, which is initially left blank. This location is expressed either in terms of a semantic location, like "inside room 123", or by a metric location, like "(x, y)" relative to a prescribed coordinate frame.

The geometric model database is also pre-programmed with the known location of each RX, which is identified in the database by the RX identifier and the network name of the RX's associated computing device. Both the RX identifier and the RX computer's network name are included, rather than just the RX computer's name, as more than one RX could be connected to a single computer and so some way of distinguishing among them is needed. Including the RX computer's name is useful in keeping track of what RXs are connected to what computer for troubleshooting and configuration control purposes. The aforementioned location is also expressed in terms of the aforementioned semantic or metric location schemes.

It might also be useful to establish an entity location database separate from the geometric model database. The entity location database is indexed by the name of the entity (e.g., the person or object, or collection thereof, associated with the entity). Each time the location of an entity is established or updated in the geometric model database, the location information would be forwarded to the entity location database. Thus, the entity location database would be solely dedicated to tracking the location of persons and objects. Such a database could be used as a central location server for an Internet service provides or for an enterprises intranet, or for a variety of other purposes unrelated to maintaining a geometric model of an environment.

3.1 The Sensor Fusion Process

The aforementioned sensor fusion process can be a continuous process that is performed on each badge hit as it is logged into the badge hit database, or it can be a periodic process that is run when a prescribed number of new badge hits have been recorded in the badge hit database, or a prescribed collection time has elapsed. The process is the same regardless of whether it is implemented continuously or periodically, with an exception that will be described below.

Figure 8A:
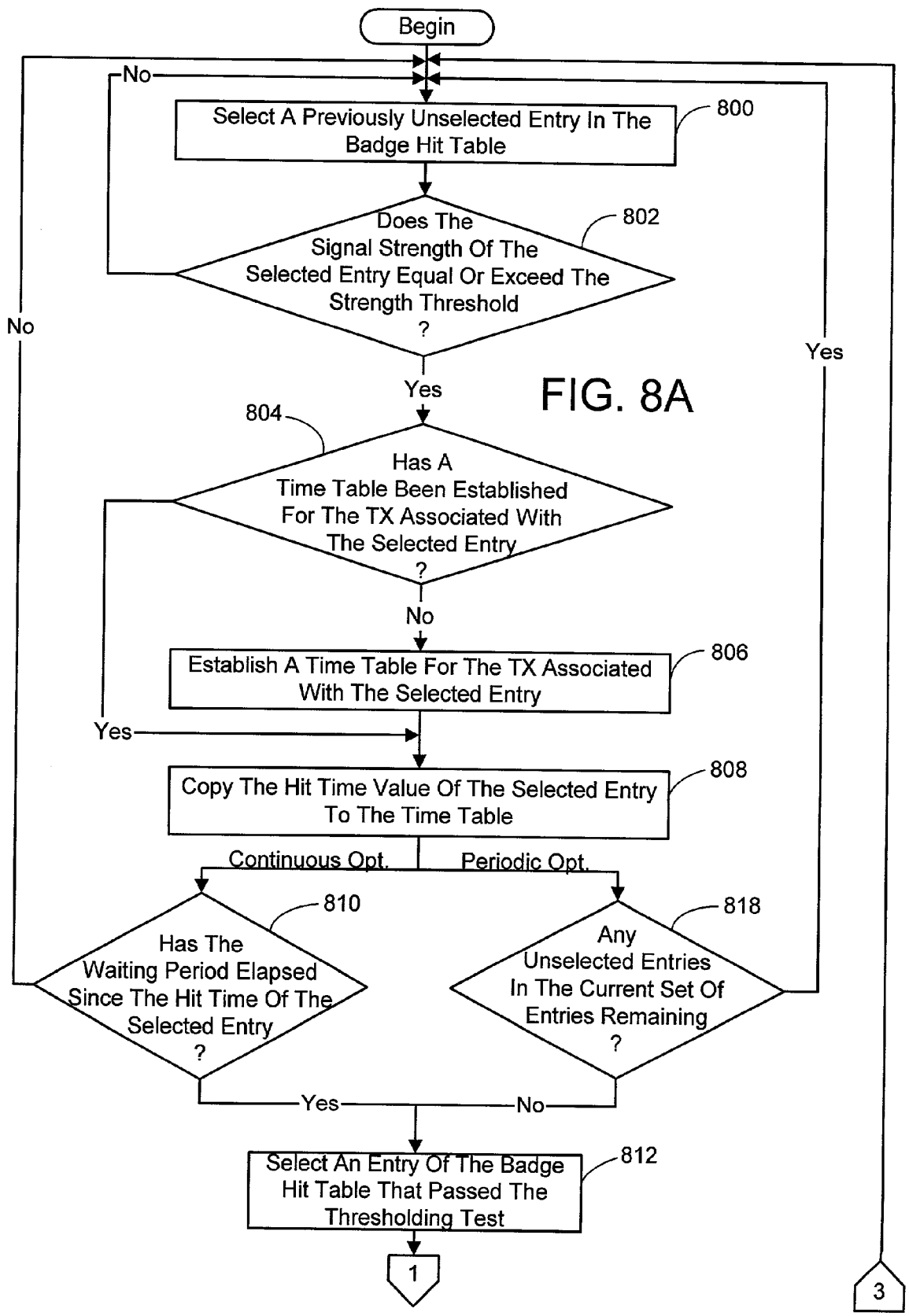
FIGS. 8A–C depict a flow chart diagramming a sensor fusion process for using badge hit data to determine the location of a TX in accordance with the overall location determining process of FIG. 6.
Figure 8B:
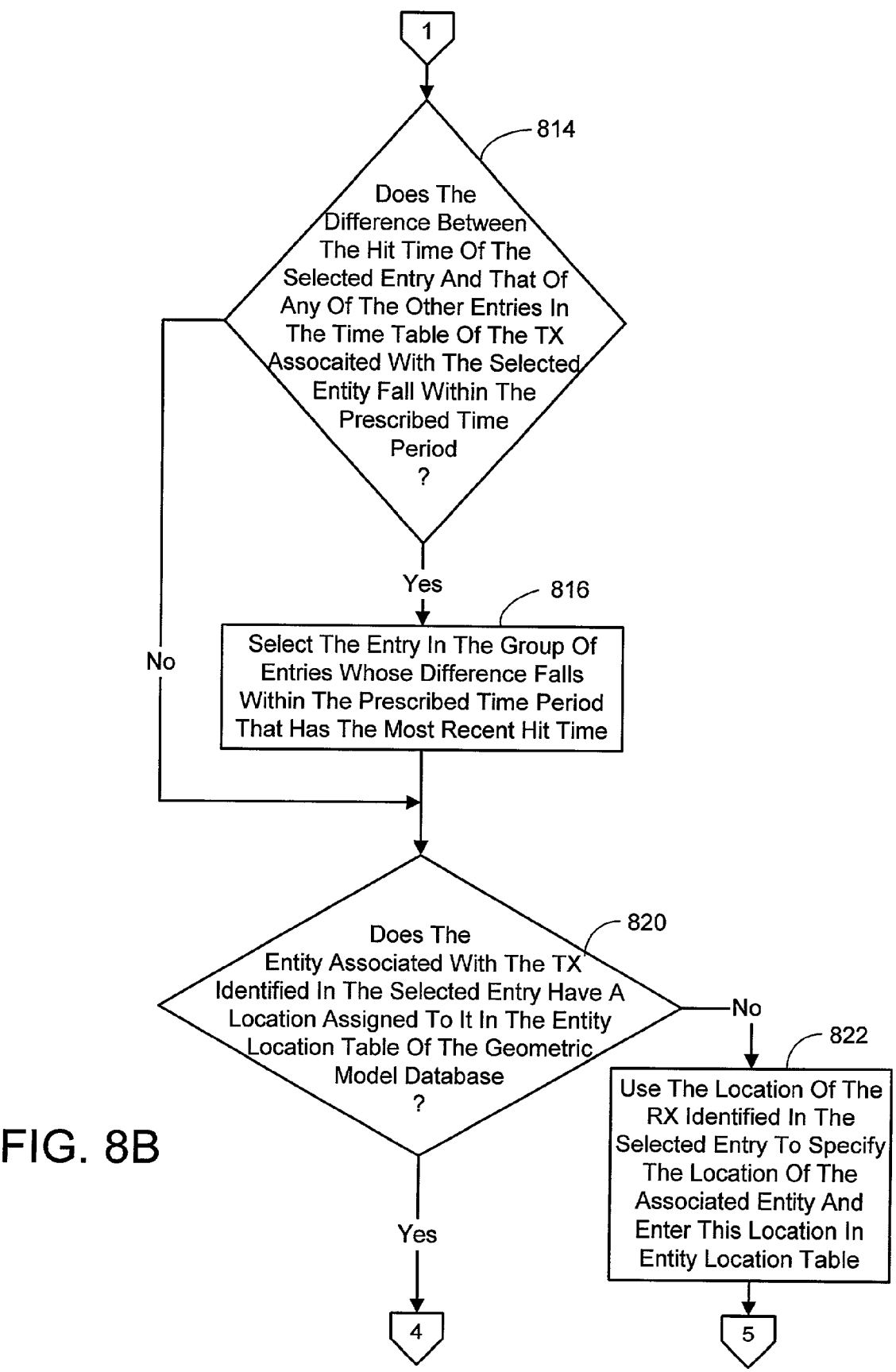
Figure 8C:
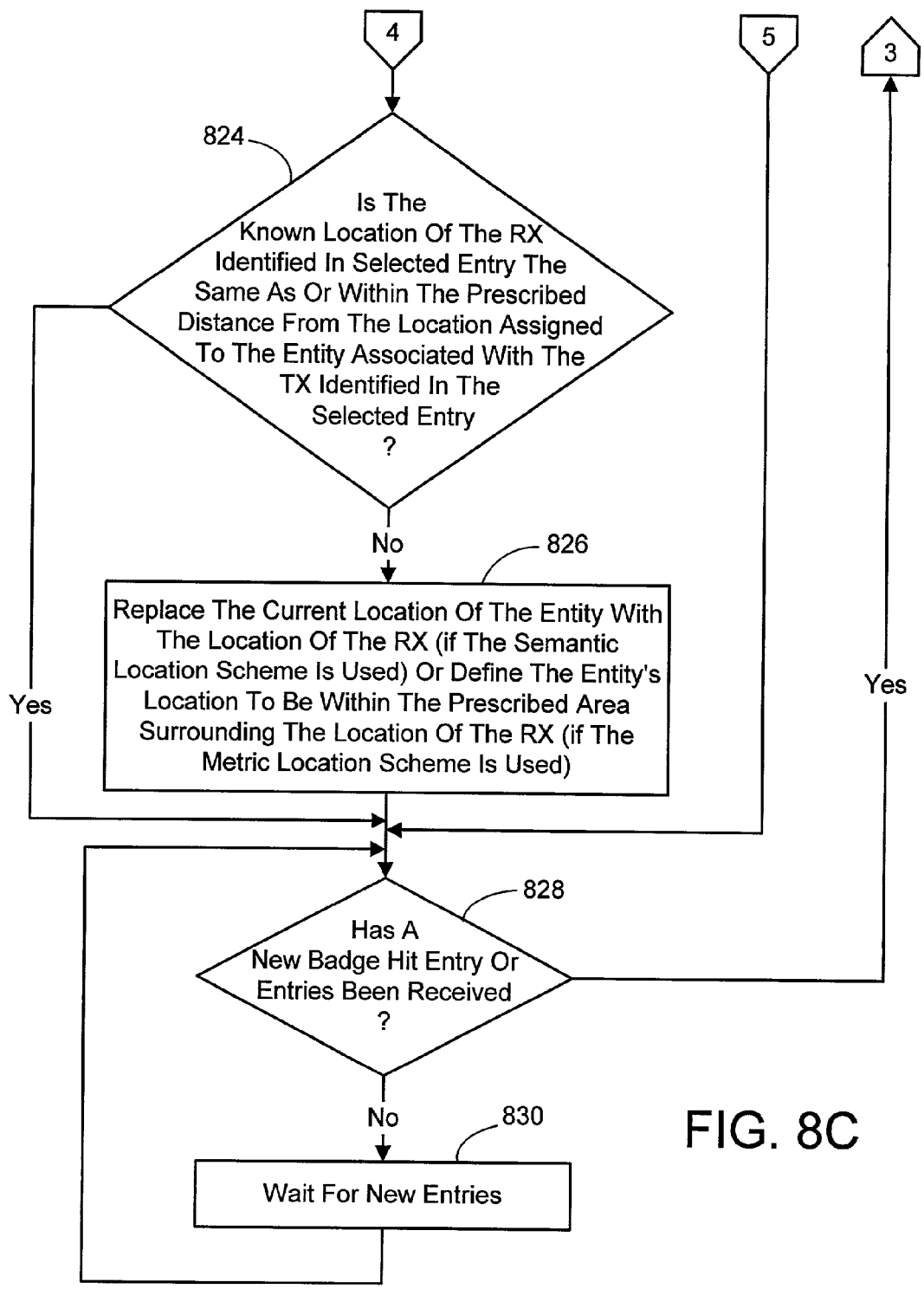

Referring to FIGS. 8A–C, the sensor fusion process will now be described. The process begins with a thresholding procedure. Specifically, a previously unselected entry (i.e., row) in the Badge Hit table is selected (process action 800). It is next determined if the signal strength value of the selected entry equals or exceeds a strength threshold representing a minimum acceptable signal strength (process action 802). If the recorded signal strength does exceed the threshold, then the location of the person or object associated with the TX responsible for the selected entry is determined, as will be described shortly. However, if the signal strength falls below the threshold, the entry is ignored, and another entry is selected for thresholding, as shown in FIG. 8A.

The strength threshold is chosen to correspond to approximately a level that would be expected if the TX was transmitting from about 1–2 meters away from the RX that originally measured the signal strength. This has two advantages. First, it ensures the TX is near the RX making the signal strength measurement, thus improving the accuracy of the location determination process. In addition, the thresholding procedure reduces the instances where two or more hits from the same TX are received by different RX's at about the same time (assuming the RX's are not positioned too closely together.) However, while the thresholding procedure greatly reduces these multiple hits, their occurrence is still possible. Multiple entries attributable to the same TX ID message transmission are undesirable as they can result in ambiguous location results. To prevent this, the next phase of the sensor fusion process involves a time conflict resolution procedure.

Essentially, the time conflict resolution procedure eliminates all but one of the hits associated with the same or a redundant TX transmission received by different RX's within a prescribed time period. This prescribed time period is set based on the network latency, and/or the rate at which the sensor fusion process cycles. In the tested embodiments of the location measurement process, this amounted to approximately 1 second. Accordingly, the prescribed time period was set to 1 second.

Referring once again to FIG. 8A, whenever a selected entry passes the thresholding test, the time conflict resolution procedure begins by determining if a Time table has been established for the TX associated with the selected entry (process action 804). The Time table is used to track the times a badge hit passing the thresholding test was logged into the Badge Hit table for a particular TX. If a Time table has not already been established for the TX associated with the selected entry, then in process action 806, one is created. Next, the hit time value of the selected entry is copied and stored in the appropriate Time table (process action 808). At this point in the process, it is determined whether the badge hit entries that passed the thresholding test will be used to ascertain the location of an entity associated with the TX whose transmission is responsible for the entry. The decision criteria revolves around whether the transmission resulting in an entry was received by one or more RXs at signal levels passing the thresholding test. If more than one RX received such a transmission, then there will be multiple entries attributable to the same transmission. Only one of these entries is chosen to compute the location of the entity associated with the TX in question. There are various ways to accomplish this task. For example, one of the entries could be chosen at random or the entry having the earliest hit time could be chosen. However, in tested embodiments of the sensor fusion process, the entry having the most recent hit time was chosen. This is accomplished differently depending on whether the sensor fusion process is performed on a continuous basis as each new badge hit entry is added to the badge hit table, or on a periodic basis where the process is performed on a set of entries. Specifically, referring now to FIGS. 8B and 8C, in process action 810 it is determined if a prescribed waiting period has elapsed since the hit time of the selected entry. If not, then process actions 800 through 810 are repeated, as appropriate, noting that the beginning of the waiting period continues to be based on the hit time of the originally selected entry and not those of any subsequently selected entries. This continues until it is determined that the prescribed waiting period has elapsed, at which point an entry of the badge hit table that passed the thresholding test is selected (process action 812). It is then determined whether the respective differences in the hit times between the selected entry and each of any other entries included in the Time table assigned to the TX associated with the selected entry fall within a prescribed time period (process action 814). If none of other entries fall within the prescribed time period, then the selected entry is used to determine the location of the entity associated with the TX responsible for the selected entry, as will be described shortly. If, however, it is discovered that one or more of the other entries do fall within the prescribed time period, then it is assumed that these and the selected entry are attributable to the same or a redundant TX transmission and the entry in this group having the most recent hit time is selected for use in determining the location of the entity associated with the TX (process action 816).

Alternately, in the periodic version of the sensor fusion process, it is first determined if there are any remaining, previously unselected entries in the current set of entries of Badge Hit table (process action 818). If so, then process actions 800 through 808, and process action 818, are repeated, as appropriate. This continues until it is determined that all the entries have been processed, at which point the process is the same as in the continuous version of the sensor fusion process. Specifically, an entry of the badge hit table that passed the thresholding test is selected (process action 812). It is then determined whether the respective differences in the hit times between the selected entry and each of any other entries included in the Time table assigned to the TX associated with the selected entry fall within the prescribed time period (process action 814). If none of other entries fall within the prescribed time period, then the selected entry is used to determine the location of the entity associated with the TX responsible for the selected entry. If, however, it is discovered that one or more of the other entries do fall within the prescribed time period, then it is assumed that these and the selected entry are attributable to the same or a redundant TX transmission and the entry in this group having the most recent hit time is selected for use in determining the location of the entity associated with the TX (process action 816).

Once a selected entry has cleared the time conflict resolution procedure, the location of the entity associated with the entry is determined. This is essentially accomplished using a space association scheme. In the space association scheme the entity's location is designated in semantic or metric terms. If a semantic location is employed, an entity is deemed to be in the same semantic location as the RX receiving the TX transmission associated with the entity, which resulted in the badge hit entry being processed. Thus, if the RX is known to the geometric model database to be "inside room 123", then the database associates that location with the entity in the entity location table. If, on the other hand, a metric location is employed, an entity is deemed to be within an area surrounding the metric location assigned to the RX receiving the TX transmission associated with the entity that resulted in the badge hit entry being processed. The extent of this area is dictated by the previously-described signal strength thresholding criteria. For example, if the signal strength threshold was chosen to correspond to approximately a level that would be expected if the TX was transmitting from about 2 meters away from the RX, then the metric location of an entity would be within 2 meters of the metric location assigned to the RX. For example, if the RX is known to the geometric model database to be at metric location (10.0, 5.0) relative to a prescribed coordinate frame, then the database specifies that the entity is within 2 meters of that location.

The space association procedure is accomplished as follows. Referring once again to FIGS. 8B and 8C, it is first determined if the entity associated with the TX identified in the selected badge hit entry that cleared the time conflict resolution procedure (which will be referred to as a valid badge hit entry) has a location assigned to it in the entity location table of the geometric model database (process action 820). If a location has not been previously assigned, then the location of the RX identified in the valid badge hit entry is used to specify the location of the entity as described previously, and this location is entered in the table (process action 822). It is then ascertained whether a new badge hit entry or entries has been received (process action 828). If not, the process waits for new entries (process action 830). Once new entries have been received, the sensor fusion process is repeated. If, however, a location has been previously assigned to the entity, then in process action 824 it is determined if the known location of the RX identified in the valid badge hit entry under consideration is the same as (if a semantic location scheme is employed), or within the specified area of (if a metric location scheme is employed), the entity associated with the TX identified in the selected entry. If the RX location is the same as or within the specified area of the entity, then the entity's location has not changed and it is ascertained whether a new badge hit entry or entries has been received (process action 828). If not, the process waits for new entries (process action 830). Once new entries have been received, the sensor fusion process is repeated. If, on the other hand, the RX location is not the same as or within the specified area of the entity, then in process action 826, the location of the entity is replaced with the location of the RX (if the semantic location scheme is used) or the entity's location is defined to be within the prescribed distance from the location of the RX (if the metric location scheme is used). It is noted that this last action can be accomplished by modifying the existing entry in the entity location table, or by creating a new entry while eliminating the old entry. Once the entity location table has been updated, it is ascertained whether a new badge hit entry or entries has been received (process action 828). If not, the process waits for new entries (process action 830). Once new entries have been received, the sensor fusion process is repeated.

3.2 The Timeout Process

Figure 9:
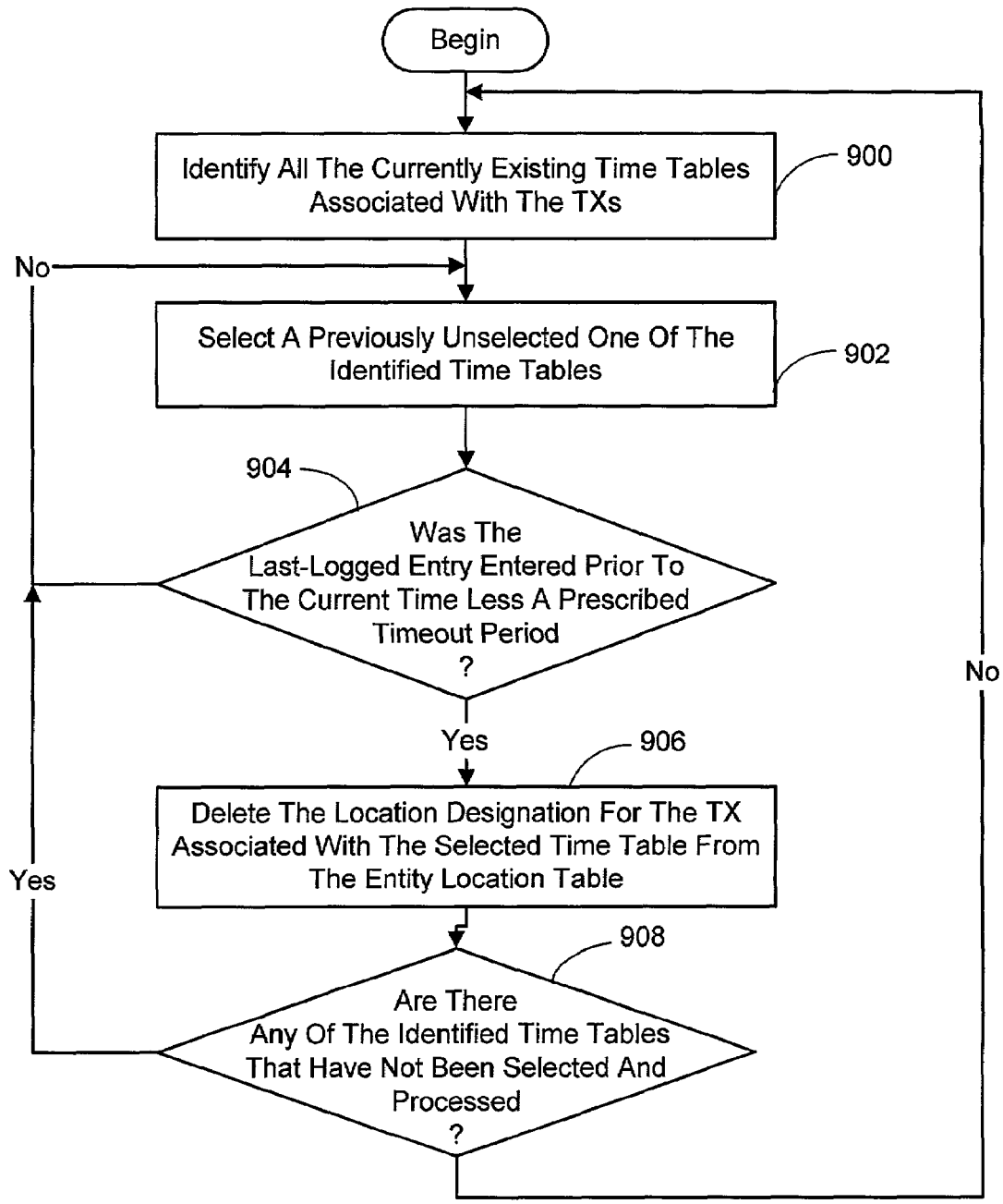
FIG. 9 is a flow chart diagramming a timeout process for eliminating stale location designations from an entity location table.

In conjunction with the sensor fusion process, the geometric model database also runs a so-called "Timeout" process, which involves eliminating stale location designations from the entity location table. Referring to FIG. 9, the timeout process begins by identifying all the existing Time tables associated with the TXs (process action 900). Next, a previously unselected one of the identified Time tables is selected (process action 902). The selected Time table is examined to determine if the last-logged badge hit entry was entered prior to the current time less a prescribed timeout period (process action 904). If not, then no action is taken, and process actions 902 and 904 are repeated for another of the identified Time tables. If, however, the last-logged entry was entered prior to the current time less the prescribed timeout period, then the location designation for the TX associated with the selected Time table is deleted from the entity location table (process action 906). It is then determined whether there are any of the identified Time tables that have not yet been selected and processed (process action 908). If not, the entire process starts over by repeating actions 900 through 908, as appropriate. However, if there are remaining unexamined Time tables form the last batch to be identified, then just process actions 902 through 908 are repeated as appropriate. The prescribed timeout period is based on the transmission period of the TX and the network latency. The preferred value for this period is a small multiple of the sum of those two periods. For example, for a TX that transmits at 1 Hz and a network with a 1 second latency, a timeout period of 6–8 seconds would be appropriate.

While the invention has been described in detail by specific reference to preferred embodiments thereof, it is understood that variations and modifications thereof may be made without departing from the true spirit and scope of the invention. For example, it is noted that the badge hit message process is quite simple in that all it requires the computing device to do is open an input port to receive data messages from the associated RX, package the incoming data along with the "network name" of the computing device, and then sent the packaged data to the badge hit database residing on the centralized computing device. Thus, the computing device can also be quite simple if desired. For instance, the computing device could take the form of a so-called network server card, such as the PicoWeb™ server card manufactured by Lightner Engineering of La Jolla, Calif. In such a case the above-described badge hit message process would be implemented as firmware instructions programmed into the server card.

Another example of a potential variation of the location measurement process involves using the accelerometer data provided in the TX ID message and optionally included in the badge hits table entries. Specifically, this motion data can be used to grade the accuracy of the RSSI measured by the RX since RSSI measurements will be more accurate when the entity associated with the TX is not moving. Thus, if the accelerometer data indicates the TX is not moving, then it can be assumed the signal strength information is accurate, or at least more accurate than if the TX was moving. This assumption could be employed in the sensor fusion process to eliminate badge hit entries associated with a moving TX from consideration when determining the location of the entity associated with the TX.

Another potential use for the accelerometer data involves an optional secure user identification scheme. In this scheme, the TX is modified to include a Personal Identification Number (PIN) input apparatus. In a simple form, this apparatus could be a number key pad such as those used on cell phones and the like. The user enters a PIN into the TX via the keypad. This PIN is preprogrammed into the geometric model database as being associated with the entity. Thus, the location of the TX is deemed to be the location of the entity corresponding to the PIN. The PIN is transmitted in each TX ID message transmitted from the TX for this purpose, along with or in lieu of the aforementioned TX identification number. The use of a PIN allows any entity to be associated with any TX as there is no need for the TX to be pre-assigned to an entity as described previously. Instead the entity is pre-assigned to a PIN and the geometric model database uses the PIN in the incoming badge hit entries to identify the entity rather than the TX identifier.

Wherefore, what is claimed is:

1. A computer-implemented process for determining the location of people and objects carrying radio frequency (RF) transmitters (TXs) that transmit TX ID messages to at least one RF receiver (RX) which is in communication with a computer in a computer network, wherein each RX forwards data received from the TXs to the network, along with a value indicating the signal strength of the received TX message, the process comprising using a computer to perform the following process actions:

each computer associated with a RX generating badge hit messages upon receipt of a data message from the RX and providing the badge hit messages to a centralized computer of the network, wherein each badge hit message includes information received in the data message comprising a transmitter identifier, the signal strength indicator associated with the TX ID message and a receiver identifier that uniquely identifies the particular RX sending the data message;

generating a badge hit table in a badge hit database residing on the centralized computer, wherein the badge hit table has a separate entry derived from each badge hit message received whose fields comprise the information received in the badge hit message and a hit time assigned to the entry indicating the time the entry was added to the badge hit table;

determining the location of each TX transmitting a TX ID message using the badge hit data, said determining comprising, screening the entries of the badge hit table to ensure that only entries having a signal strength value equaling or exceeding a prescribed level, and that only one entry per TX transmission, are used to determine the location of a TX whose transmission resulted in the entry, said screening comprising, for each entry of the badge hit table, determining whether the signal strength value of the entry exceeds a signal strength threshold, and whenever the signal strength of the entry equals or exceeds the signal strength threshold, deeming the entry to have passed a thresholding test, determining if a time table has been established for the TX associated with the entry and if not creating one, wherein said time table logs the hit time of each entry associated with the TX that passes the thresholding test, logging the hit time of the entry under consideration in the time table assigned to the TX associated with the entry under consideration, ascertaining whether the respective differences in the hit time of the entry under consideration and each previously logged hit time of the time table assigned to the TX associated with the entry under consideration fall within a prescribed time period, whenever the differences between the hit time of the entry under consideration and the hit times of all the previous entries in the time table assigned to the TX associated with the entry under consideration fall outside the prescribed time period, deeming the entry under consideration to have cleared a time conflict resolution procedure and ready for further processing to determine the location of the TX, and whenever the difference between the hit time of the entry under consideration and the hit time of one or more of the previous entries in the time table assigned to the TX associated with the entry under consideration fall within the prescribed time period, assuming these entries are attributable to the same or a redundant TX transmission and selecting just one of them for further processing to determine the location of the TX, wherein the entry selected for further processing is deemed to have cleared the time conflict resolution procedure, and determining the location of the TX associated with each of the screened entries having a signal strength value equaling or exceeding the prescribed level and representing the only entry attributable to a TX transmission that is used to determine the TX's location, based on a known location of the RX identified in the entry, wherein the known location of a RX is obtained from the geometric model data base which maintains a list of each RX and its location within an environment modeled by the geometric model database; and updating an entity location table of a geometric model database with the location of entities included therein, wherein the entity location table comprises a list of entities and the TX identifier of a TX that is associated with each entity, as well as the location of the entity if known, and wherein said entity is a person, object or a collection of persons and objects and the location of the entity is the location determined for the TX associated with the entity.

2. The process of claim 1, wherein the prescribed time period is set based on the latency of said network and the rate at which the entries in the badge hit table processed.

3. The process of claim 2, wherein the prescribed period of time is approximately 1 second.

4. The process of claim 1, wherein the process action of selecting just one of the entries for further processing to determine the location of the TX, comprises an action of selecting one of the entries randomly.

5. The process of claim 1, wherein the process action of selecting just one of the entries for further processing to determine the location of the TX, comprises an action of selecting the entry of the group of entries assumed to be attributable to the same or redundant TX transmission that has the earliest hit time.

6. The process of claim 1, wherein the process action of selecting just one of the entries for further processing to determine the location of the TX, comprises an action of using the entry of the set of entries assumed to be attributable to the same or redundant TX transmission that has the most recent hit time for further processing to determine the location of the TX.

7. A computer-implemented process for determining the location of people and objects carrying radio frequency (RF) transmitters (TXs) that transmit TX ID messages to at least one RF receiver (RX) which is in communication with a computer in a computer network, wherein each RX forwards data received from the TXs to the network, along with a value indicating the signal strength of the received TX message, the process comprising using a computer to perform the following process actions:

each computer associated with a RX generating badge hit messages upon receipt of a data message from the RX and providing the badge hit messages to a centralized computer of the network, wherein each badge hit message includes information received in the data message comprising a transmitter identifier, the signal strength indicator associated with the TX ID message and a receiver identifier that uniquely identifies the particular RX sending the data message;

generating a badge hit table in a badge hit database residing on the centralized computer, wherein the badge hit table has a separate entry derived from each badge hit message received whose fields comprise the information received in the badge hit message and a hit time assigned to the entry indicating the time the entry was added to the badge hit table;

determining the location of each TX transmitting a TX ID message using the badge hit data, said determining comprising, screening the entries of the badge hit table to ensure that only entries having a signal strength value equaling or exceeding a prescribed level, and that only one entry per TX transmission, are used to determine the location of a TX whose transmission resulted in the entry, and determining the location of the TX associated with each of the screened entries having a signal strength value equaling or exceeding the prescribed level and representing the only entry attributable to a TX transmission that is used to determine the TX's location, based on a known location of the RX identified in the entry, wherein the known location of a RX is obtained from the geometric model data base which maintains a list of each RX and its location within an environment modeled by the geometric model database; and updating an entity location table of a geometric model database with the location of entities included therein, wherein the entity location table comprises a list of entities and the TX identifier of a TX that is associated with each entity, as well as the location of the entity if known, and wherein said entity is a person, object or a collection of persons and objects and the location of the entity is the location determined for the TX associated with the entity, and wherein said updating comprises for every screened entry having a signal strength value equaling or exceeding the prescribed level and representing the only entry attributable to a TX transmission that is used to determine the TX's location, determining whether the entity associated with the TX identified in the entry has a location assigned to it in the entity location table of the geometric model database, whenever a location has not been previously assigned to the entity in the entity location table, assigning a location to the entity corresponding to the known location of the RX identified in the entry and entering the location in the entity location table, wherein the location of the RX is defined in semantic terms in that the location refers to a predefined space in which the RX is located, whenever a location has been previously assigned to the entity in the entity location table, determining whether the location is the same as the location of the RX, and whenever it is determined that the location assigned to the entity in the entity location table is not the same as the location of the RX, replacing the location currently assigned to the entity with the location of the RX.

8. A computer-implemented process for determining the location of people and objects carrying radio frequency (RF) transmitters (TXs) that transmit TX ID messages to at least one RF receiver (RX) which is in communication with a computer in a computer network, wherein each RX forwards data received from the TXs to the network, along with a value indicating the signal strength of the received TX message, the process comprising using a computer to perform the following process actions:

each computer associated with a RX generating badge hit messages upon receipt of a data message from the RX and providing the badge hit messages to a centralized computer of the network, wherein each badge hit message includes information received in the data message comprising a transmitter identifier, the signal strength indicator associated with the TX ID message and a receiver identifier that uniquely identifies the particular RX sending the data message;

generating a badge hit table in a badge hit database residing on the centralized computer, wherein the badge hit table has a separate entry derived from each badge hit message received whose fields comprise the information received in the badge hit message and a hit time assigned to the entry indicating the time the entry was added to the badge hit table;

determining the location of each TX transmitting a TX ID message using the badge hit data, said determining comprising, screening the entries of the badge hit table to ensure that only entries having a signal strength value equaling or exceeding a prescribed level, and that only one entry per TX transmission, are used to determine the location of a TX whose transmission resulted in the entry, and determining the location of the TX associated with each of the screened entries having a signal strength value equaling or exceeding the prescribed level and representing the only entry attributable to a TX transmission that is used to determine the TX's location, based on a known location of the RX identified in the entry, wherein the known location of a RX is obtained from the geometric model data base which maintains a list of each RX and its location within an environment modeled by the geometric model database; and updating an entity location table of a geometric model database with the location of entities included therein, wherein the entity location table comprises a list of entities and the TX identifier of a TX that is associated with each entity, as well as the location of the entity if known, and wherein said entity is a person, object or a collection of persons and objects and the location of the entity is the location determined for the TX associated with the entity, and wherein said updating comprises for every screened entry having a signal strength value equaling or exceeding the prescribed level and representing the only entry attributable to a TX transmission that is used to determine the TX's locations, determining whether the entity associated with the TX identified in the entry has a location assigned to it in the entity location table of the geometric model database, whenever a location has not been previously assigned to the entity in the entity location table, assigning a location to the entity defined as being within a prescribed distance from the known location of the RX identified in the entry and entering the location in the entity location table, wherein the location of the RX is characterized in metric terms in that the location is the coordinates at which the RX is located relative to a prescribed coordinate frame, whenever a location has been previously assigned to the entity in the entity location table, determining whether the entity's currently assigned location is within the prescribed distance from the known location of the RX identified in the entry, and whenever it is determined that the location currently assigned to the entity in the entity location table is not within the prescribed distance from the known location of the RX, replacing the location currently assigned to the entity with a location specifying that the entity is within the prescribed distance from the location of the RX.

9. The process of claim 8, wherein the process action of screening the entries of the badge hit table, comprises the actions of, for each entry of the badge hit table:

determining whether the signal strength value of the entry exceeds a signal strength threshold; and whenever the signal strength of the entry equals or exceeds the signal strength threshold, deeming the entry to have passed a thresholding test; and wherein the signal strength threshold is chosen to correspond to approximately a level that would be expected if the TX associated with an entry was transmitting from a prescribed transmitting distance away from the RX that originally measured the signal strength; and wherein the prescribed distance from the known location of the RX that defines the location of the entity corresponds to the prescribed transmitting distance.

* * * * *

UNITED STATES PATENT AND TRADEMARK OFFICE
CERTIFICATE OF CORRECTION

PATENT NO. : 6,993,592 B2 Page 1 of 1
APPLICATION NO. : 10/137238
DATED : January 31, 2006
INVENTOR(S) : John Krumm et al.

It is certified that error appears in the above-identified patent and that said Letters Patent is hereby corrected as shown below:

Title page 2, in field (56), under "Other Publications", in column 2, line 8, delete "Prividing" and insert -- Providing --, therefor.

Figure 6:
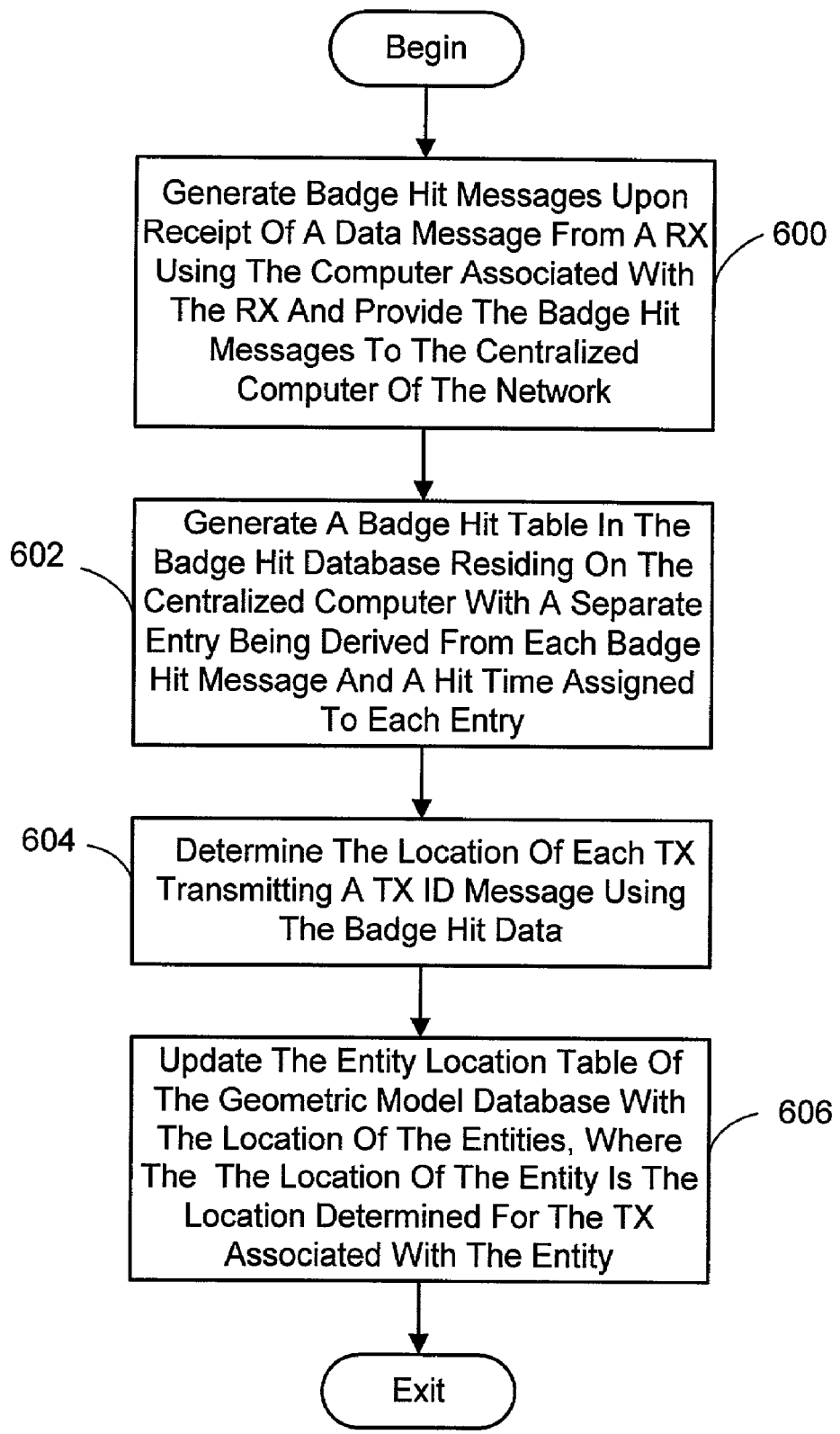
FIG. 6 is a flow chart diagramming an overall process for determining the location of entities carrying transmitters of the location tracking system of FIG. 1.

On Sheet 4 of 9, Fig. 6 (Box 606), line 4, delete "The" before "Location". (Second Occurrence)

On Sheet 7 of 9, Fig. 8B (Box 814), line 7, delete "Assocaited" and insert -- Associated --, therefor.

In column 15, line 36, delete "(i.e," and insert -- i.e., --, therefor.

In column 25, line 8, in Claim 8, delete "locations" and insert -- location --, therefor.

Signed and Sealed this

Twenty-eighth Day of July, 2009

JOHN DOLL
*Acting Director of the United States Patent and Trademark Office*